United States Patent [19]

Masaki

[11] 4,348,578

[45] Sep. 7, 1982

[54] WORKPIECE MONITORING MEANS FOR ELECTRIC DISCHARGE WORKING APPARATUS

[75] Inventor: Ichiro Masaki, Kobe, Japan

[73] Assignee: Unimation, Inc., Danbury, Conn.

[21] Appl. No.: 66,323

[22] Filed: Aug. 14, 1979

[30] Foreign Application Priority Data

Aug. 15, 1978 [JP] Japan .................................. 53/99319

[51] Int. Cl.³ .............................................. B23K 9/10
[52] U.S. Cl. ......................... 219/130.01; 219/130.21; 219/130.31; 219/130.51; 219/69 C
[58] Field of Search ...................... 219/130.01, 130.21, 219/130.31, 130.32, 130.33, 137 PS, 130.51, 69 M, 69 C, 69 P, 69 G, 124.03

[56] References Cited

U.S. PATENT DOCUMENTS

| | | | |
|---|---|---|---|
| 3,609,281 | 9/1971 | Kauffman | 219/69 M |
| 4,021,635 | 5/1977 | Losey et al. | 219/69 G |
| 4,170,727 | 10/1979 | Wilkins | 219/124.03 |

FOREIGN PATENT DOCUMENTS

| | | | |
|---|---|---|---|
| 2834850 | 2/1979 | Fed. Rep. of Germany | 219/69 C |
| 536910 | 11/1976 | U.S.S.R. | 219/130.21 |

*Primary Examiner*—C. C. Shaw
*Attorney, Agent, or Firm*—Fleit & Jacobson

[57] ABSTRACT

An automatic arc welding machine having a welding torch adapted to be placed against a workpiece and a monitoring sensor such as an image taking tube for sensing the workpiece. The operation of the sensor is so controlled that it is operated when the welding current to the torch is interrupted or decreased so that any effect of welding arc on the image taking tube can be avoided.

13 Claims, 11 Drawing Figures

(a) IMAGE TAKING
(b) WELDING VOLTAGE
(c) WELDING VOLTAGE

WORKPIECE MONITORING MEANS FOR ELECTRIC DISCHARGE WORKING APPARATUS

The present invention relates to electric discharge working apparatus such as arc welding machines and plasmic cutting machines. More particularly, the present invention pertains to method and apparatus for monitoring workpieces in such machines.

Electric discharge working apparatus have been widely used for welding or cutting workpieces making use of energies under electric discharges. In order to monitor the positions being worked or inspect the quality of work, monitoring systems are provided in such apparatus. Such monitoring system may comprise an image taking tube which optically senses the workpiece. Instead of such image taking tube, a magnetic sensing device may be used so that the workpieces are monitored by means of magnetic signals. The sensing element of such monitoring system, that is, the image taking tube or the magnetic sensing device may be located in advance to or behind the point where the work is being done.

In the aforementioned types of workpiece monitoring systems, problems have been encountered in that it has been difficult to produce images of high quality due to the existence of intense light inherent to the discharge arc or electromagnetic noises caused by the discharge current. In order to eliminate the above problems, it has been proposed to provide a masking plate between the discharge electrode and the image taking tube or to provide pre-processing means for processing the signal from the sensing device so that the noise is screened out.

It has however been found that none of the aforementioned proposals has been satisfactory. In the arrangement wherein the masking plate is disposed between the discharge electrode and the image taking tube, inconveniencies have been encountered in that the masking plate becomes very often obstructive. Moreover, it has been required in order to eliminate the influence of the arc discharge illumination to locate the image taking tube sufficiently away in horizontal direction from the discharge electrode. It should therefore be noted that, where an adequate space is not available, the image taking tube itself may sometimes be obstructive.

The image signal processing arrangement wherein a noise screening device is provided has disadvantages in that complicated arrangements are required for processing the image signals and that the processing time is correspondingly increased. Thus, the system is not applicable to a high speed welding apparatus. Accordingly, it is difficult to apply to a sheet metal welding operation wherein heat input must be maintained as small as possible. This type of image signal processing device is further disadvantageous in that the arrangement itself becomes very expensive due to the adoption of the aforementioned noise screening device.

It is therefore an object of the present invention to provide method and apparatus for producing high quality images of workpieces without being disturbed by the intense light of arc discharge or by electromagnetic noise.

Another object of the present invention is to provide less expensive method and apparatus for producing high quality images of workpieces in electric discharge working apparatus.

According to the present invention, the above and other objects can be accomplished by a method for monitoring workpieces in electric discharge working process in which electric discharge is intermittently interrupted, characterized by the fact that said workpiece is sensed when the electric discharge is interrupted so as to produce a signal representing the condition of the workpiece.

In accordance with the present invention, there is also provided an apparatus for performing a work through an electric discharge, which comprises discharge electrode means adapted to be placed against workpiece, electric power supply means for supplying electric power across the electrode means and the workpiece, workpiece monitoring means including sensing means for sensing a condition of the workpiece, activating means for bringing said sensing means into operation, control means provided between said electric power supply means and the activating means for alternately cutting said two means so that the sensing means of the monitoring means is brought into operation when the power supply to the discharge electrode means is interrupted.

According to another aspect of the present invention, the apparatus includes means for detecting voltage of the electric power supplied by said electric power supply means and means associated with the activating means for cutting the same when the voltage from said electric power supply means is above a predetermined value so that said sensing means is brought into operation only when said voltage is below said predetermined value and electric discharge cannot therefore take place.

In accordance with the present invention, the sensing means of the workpiece monitoring means is mostly operated when the discharge is not taking place. Therefore, it is possible to obtain a high quality image of the workpiece without being affected by the intense light of the discharge arc or by electromagnetic noise due to the discharge current across the electrode means and the workpiece. In one mode of the present invention, the sensing means may be an image taking tube for optically sensing the workpiece which may, without the arrangement of the present invention, be affected by the intense light of the discharge arc. In another mode, the sensing means may be a magnetic sensing device for magnetically sensing the workpiece.

In the arrangement of the present invention, it is no longer necessary to provide a masking plate between the discharge electrode and the sensing means nor to provide noise screening device as in the conventional arrangement. It should however be noted that the image of the workpiece can further be improved if such masking plate or noise screening device is used in combination with the arrangement of the present invention. The present invention can be applied to any kind of apparatus wherein a workpiece or workpieces are worked through the energy of electric discharge. Examples of such apparatus are welding machines, metal cutting machines, etc.

The above and other objects and features of the present invention will become apparent from the following descriptions of preferred embodiments taking reference to the accompanying drawings, in which.

Figure 3:
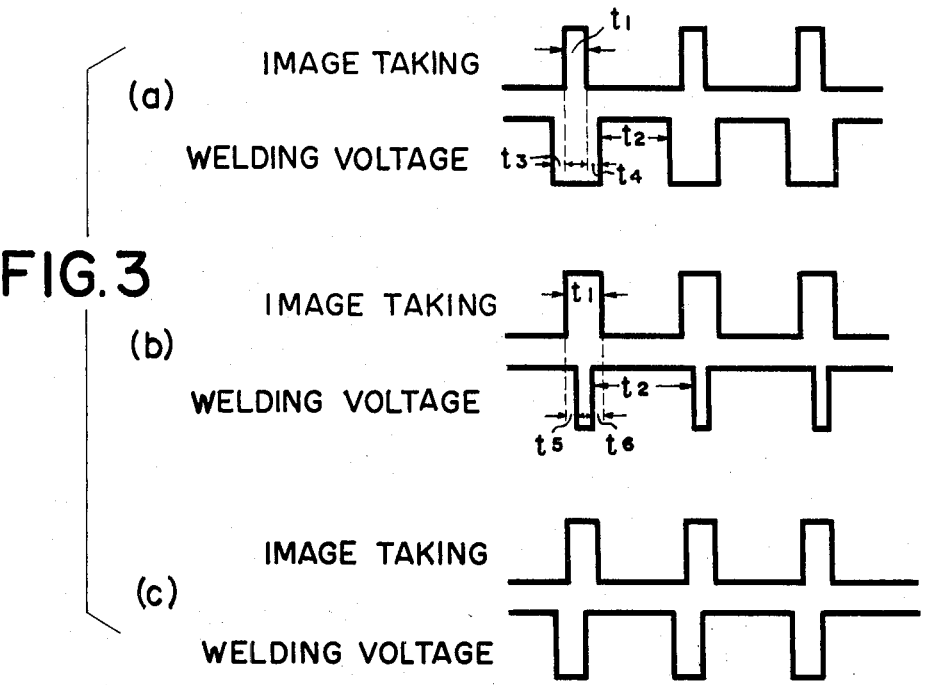
Figure 5:
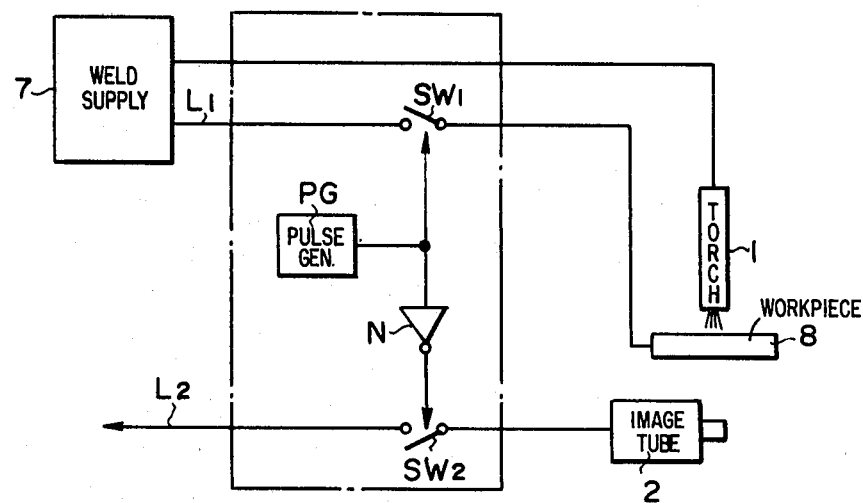
Figure 6:
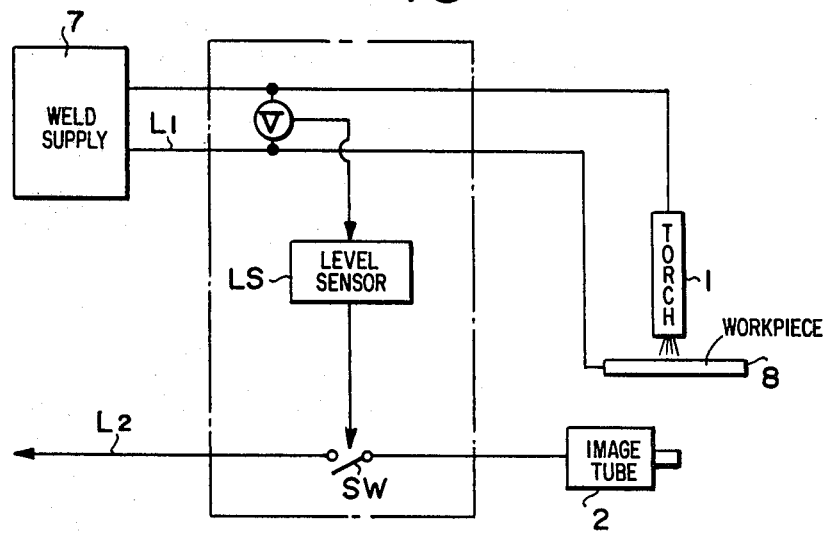

FIGS. 3(a), (b) and (c) respectively show alternative combinations of the image taking periods and the welding periods;

FIGS. 4(a), (b), (c) and (d) show different ways of interrupting electric discharge;

FIG. 5 is a diagram showing one embodiment of the present invention; and,

FIG. 6 is a diagram showing another embodiment of the present invention.

Figure 1:
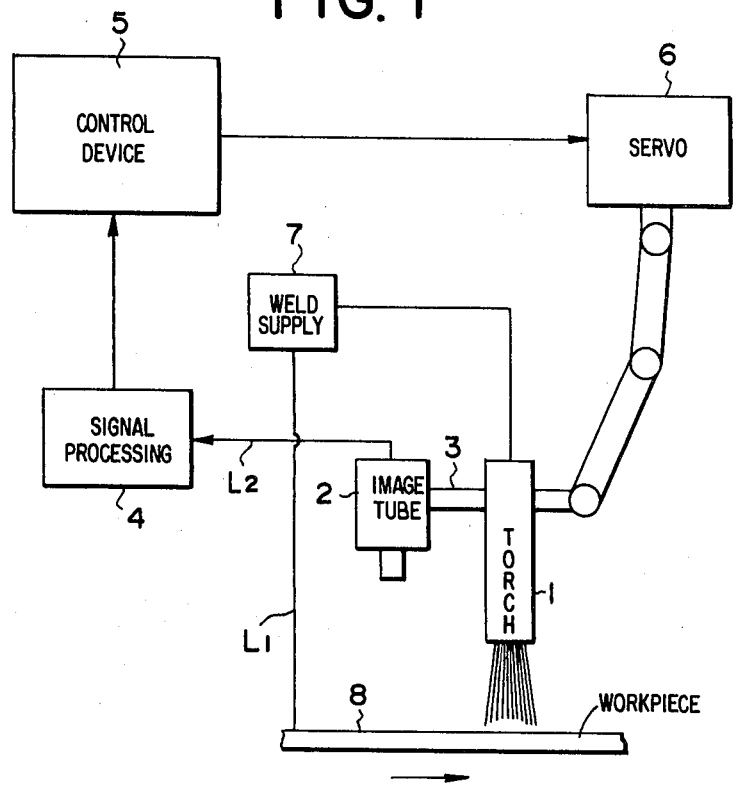
FIG. 1 is a diagrammatical illustration of an automatic arc welding machine to which the present invention can be applied.

Referring now to the drawings, particularly to FIG. 1, the automatic welding machine shown therein includes a discharge electrode or a welding torch 1 having an image taking tube 2 connected therewith through a movable support member 3. The image taking tube 2 is connected through a line $L_2$ with a signal processing device 4 which is in turn connected with a control device 5. The control device 5 has an output connected with a servo device 6 which functions to drive the movable support member 3 carrying the welding torch 1 and the image taking tube 2. A welding current supply device 7 is provided and connected with the welding torch 1 to supply an electric power to the torch 1. The welding torch 1 and the image taking tube 2 are positioned against a workpiece 8 which is to be welded. A line $L_1$ connects the workpiece 8 with the device 7. As shown by an arrow in FIG. 1, the workpiece 8 is moved with respect to the welding torch 1 and the image taking tube 2 so that the image taking tube 2 takes a view of the area of the workpiece ahead of the welding position. The signal processing device 4 receives an image signal from the tube 2 and performs a calculation to detect the position on the workpiece 8 which will in the future be subjected to a welding operation. The control device 5 receives a signal from the signal processing device and when necessary produces a signal to actuate the servo device 6 so that the welding torch 1 is located at a correct position. The image taking tube 2 may be substituted by a magnetic sensing device which functions to magnetically sense the workpiece 8. The image taking tube 2 or other type of sensing device may be positioned behind the welding torch 1 so that the quality of weld can be inspected by the monitoring system.

Figure 2:
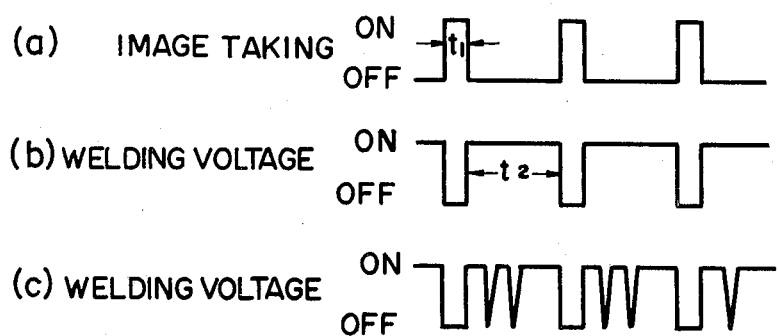
FIG. 2 is a time chart showing the image taking periods in relation to the welding periods.

According to the present invention, in order to eliminate the adverse effects of the intense light of the discharge arc or the electromagnetic noise, the sensing device 2 is operated when the supply of welding electric current is interrupted. Referring to FIG. 2, the diagram (a) shows time periods $t_1$ in which the sensing device 2 is operated whereas the diagram (b) shows time periods $t_2$ in which the sensing device 2 is not operated when the welding current is supplied. FIG. 2(c) shows an alternative way of supplying a welding current. It will be noted in FIG. 2 that the sensing device 2 is operated when the supply of welding current is interrupted. As an example, the sensing device 2 may be operated for approximately 1/450 seconds and the welding current may be supplied for approximately 44/450 seconds. The sensing device 2 may cover at a time a sufficient area so that a continuous length of workpiece can be monitored by sequential operations of the sensing device, or alternatively, it may cover only intermittent areas on the workpiece.

In the examples shown in FIG. 2, the operating periods of the sensing device are complemental to the welding current supply periods. However, the operating periods of the sensing device may be smaller than or may in part be overlapped with the welding current supply periods. For example, as shown by FIG. 3(a), the sensing device 2 may be operated after a time $t_3$ from the interruption of the welding current and brought out of operation before a time $t_4$ to the restart of the welding current supply. In the example shown in FIG. 3(b), the sensing device is operated from a certain time $t_5$ before the welding current is interrupted to as time $t_6$ after the supply of the welding current is restarted. This arrangement is considered as being advantageous when it is desired to keep the interruption time of the welding current as small as possible. In FIG. 3(c), the sensing device is operated after the supply of welding current is interrupted and brought out of operation after restart of supply of welding current. This arrangement is effective to avoid any influence of residual light which may remain even after the interruption of the welding current. During the beginning of restart of the welding current supply, the light of the discharge arc is not so strong that there will be no serious effects in this period on the sensing device.

Figure 4:
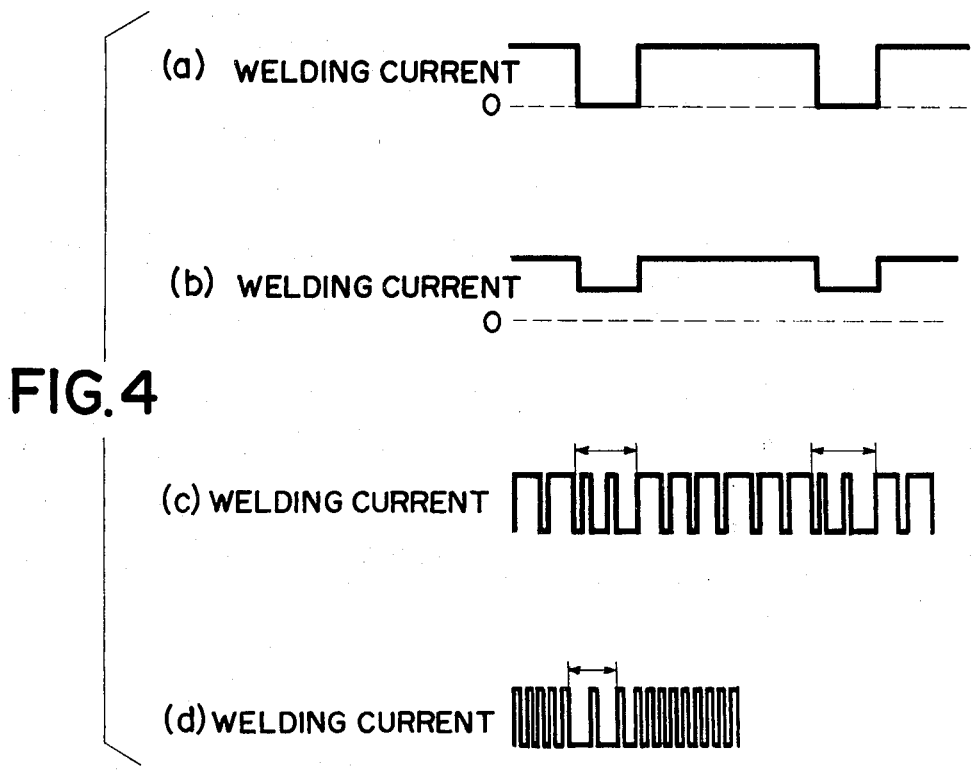

Referring now to FIG. 4, there are shown several ways of interrupting the welding current. In FIG. 4(a), the current supply is completely stopped but, in FIG. 4(b), the level of supply current is decreased so that the discharge arc is significantly weakened. In FIGS. 4(c) and (d), the current is supplied in the form of pulses of which durations and frequency are respectively changed to provide an interruption of the discharge. In any event, the arc discharge is intermittently interrupted or at least weakened.

Referring to FIG. 5 which shows one embodiment of the present invention, the line $L_1$ connecting the welding current supply device 7 with the workpiece 8 is provided with a switch $SW_1$ which is adapted to be controlled by a pulse generator PG. In the line $L_2$ from the sensing device 2, there is provided a switch $SW_2$ which is controlled by the signal supplied from the pulse generator PG through a signal reversing circuit N. The pulse generator PG produces a series of pulses of a predetermined frequency and the switch $SW_1$ is closed to complete the welding circuit when a high level signal is supplied from the pulse generator PG. When a low level signal is produced at the pulse generator PG, the signal is inverted by the signal reversing circuit N so that a high level signal is applied to the switch $SW_2$ so that the sensing device 2 is put into operation and the signal from the device 2 is transmitted through the line $L_2$ to the signal processing device 4.

Referring to FIG. 6, there is shown another embodiment in which a potentiometer V is inserted across the welding torch 1 and the workpiece 8 and the output of the potentiometer V is connected with a level sensor LS. The line $L_2$ from the sensing device 2 is provided with a switch SW which is adapted to be controlled by the output of the level sensor LS. The level sensor LS functions to detect the voltage level as measured by the potentiometer V and produces a signal when the voltage level is below a predetermined value. In the welding machine, the welding electrode wire is often brought into contact with the workpiece so that the voltage across the welding torch and the workpiece 8 is decreased. The arrangement shown in FIG. 6 functions to detect that the voltage is decreased and put the sensing device 2 into operation at the moment.

The invention has thus been shown and described with reference to specific arrangements, however, it should be noted that the invention is in no way limited to the details of the illustrated arrangements but changes and modifications may be made without departing from the scope of the appended claims. For example, it is within the scope of the present invention to provide a photo-transistor or the like to detect the intensity of welding arc and control the operation of the workpiece sensing device accordingly. Alternatively, in the arrangement shown in FIG. 6, the welding current may be detected in lieu of the voltage. It is of course possible to combine the arrangements shown in FIGS. 5 and 6 so that the operation of the sensing device is basically controlled by the output of the potentiometer through the level sensor but the pulse generator is brought into operation when the interruption of the discharge does not take place for a certain period of time.

We claim:

1. A method for monitoring a workpiece in a light generating arc welding process, wherein arc welding is performed by optically detecting the position of the workpiece to be arc welded and controlling the position of a welding torch on the basis of the result of the detection, the method comprising the steps of substantially repetitively interrupting the welding process at selected intervals by control of the power to the welding torch, and optically detecting the position of the workpiece via a positional image signal at said selected, repetitive intervals when the welding process is substantially interrupted and the light generation of the arc welding arrangement is reduced.

2. Apparatus for performing an automatic arc welding operation, comprising discharge electrode means adapted to be placed against a workpiece for performing arc welding, electric power supply means for supplying electric power across said electrode means and the workpiece said electric power supply means including means for substantially decreasing the power supplied to the electrode at selected repetitive intervals, workpiece monitoring means for monitoring the workpiece and including optical sensing means for optically sensing at selected, repetitive intervals a positional image of the workpiece to be welded, activating means for bringing said optical sensing means into operation, and control means provided between said electric power supply means and said activating means for operating said electric power supply means and said activating means so that said optical sensing means is brought into operation at said selected, repetitive intervals when the power supply to the discharge electrode means is substantially decreased.

3. Apparatus in accordance with claim 2, wherein said sensing means has a signal output, said activating means comprising switch means responsive to said signal output for closing to activate said sensing means when the power supply to the discharge electrode means is substantially decreased.

4. Apparatus for performing an automatic arc welding operation, comprising discharge electrode means adapted to be placed against a workpiece for performing arc welding, electric power supply means for supplying electric power across said electrode means and the workpiece, workpiece monitoring means for monitoring the workpiece and including sensing means for sensing a position of the workpiece to be welded, activating means for bringing said sensing means into operation, and control means provided between said electric power supply means and said activating means for operating said electric power supply means and said activating means so that said sensing means is brought into operation when said power supply to the discharge electrode means is substantially decreased, said electric power supply means including a first switch, said sensing means including a signal output line provided with a second switch, said control means comprising pulse generating means for producing pulse signals and providing said pulse signals to said first switch to intermittently open the first switch, signal reversing means for inverting the pulse signals from said pulse generating means to produce inverted signals and providing said inverted signals to said second switch so that the second switch is closed when the first switch is opened and vice-versa.

5. Apparatus for performing a work operation through an electric discharge, comprising discharge electrode means adapted to be placed against a workpiece for producing said electric discharge, electric power supply means for supplying electric power and a voltage across the electrode means and the workpiece, workpiece monitoring means for monitoring said workpiece and including sensing means for sensing a condition of the workpiece, activating means for bringing said sensing means into operation, detecting means for detecting said voltage across the discharge electrode means and the workpiece, said sensing means including a signal output line, a switch connected to said signal output line, and level sensing means for sensing said voltage across the electrode means and the workpiece and responsive thereto for closing said switch when the voltage is below a predetermined value.

6. Workpiece monitoring apparatus for a light generating arc-welding arrangement having a welding torch and being arranged to perform an arc welding work cycle on a workpiece, the workpiece monitoring apparatus comprising:

means for optically sensing the position of the workpiece at selected repetitive intervals during the arc welding work cycle, said position sensing means comprising means for projecting light onto the workpiece, image detection means for developing a positional image signal of the workpiece and sensing by reflection the light projected onto the workpiece by said projecting means, and means for selectively operating said image detection means; and means for interrupting the arc welding process on the workpiece at said selected repetitive intervals by at least substantially decreasing the power to the welding torch, said image detection means being operated during said selected repetitive intervals during the arc welding work cycle when said light generation of said arc welding arrangement is reduced.

7. The workpiece monitoring apparatus of claim 6 wherein said sensing means senses the position of the workpiece during a predetermined sensing time period at each of said selected intervals.

8. The workpiece monitoring apparatus of claim 7 wherein said interrupting means comprises means for substantially reducing the welding current to the welding torch during said sensing time periods.

9. The workpiece monitoring apparatus of claim 8 wherein said interrupting means further comprises means for controlling the operation of the welding current reducing means a predetermined time before the beginning of each of said sensing time periods.

10. The workpiece monitoring apparatus of claim 9 wherein said controlling means further continues operation of said welding current reducing means for a predetermined time after the end of each of said sensing time periods.

11. The workpiece monitoring apparatus of claim 9 wherein said controlling means further comprises means for terminating operation of said welding current reducing means a predetermined time before the end of each of said sensing time periods.

12. The workpiece monitoring apparatus of claim 7 wherein said interrupting means comprises means for substantially reducing the average welding current for a predetermined time period during each of said sensing time periods.

13. Workpiece monitoring apparatus for a light generating arc welding arrangement having a welding torch and being arranged to perform an arc welding work cycle on a workpiece, the workpiece monitoring apparatus comprising:

means for optically sensing a positional image of the workpiece at selected repetitive intervals during the arc welding work cycle; and means for substantially reducing the light generated by the welding arc at said selected repetitive intervals when said sensing means senses the position of the workpiece.

* * * * *